United States Patent [19]

Croisant et al.

[11] 4,223,773
[45] Sep. 23, 1980

[54] DRIVE ENGAGING APPARATUS

[75] Inventors: Elmer E. Croisant; Kass W. Sawyer, both of Oshkosh, Wis.

[73] Assignee: Brunswick Corporation, Skokie, Ill.

[21] Appl. No.: 832,196

[22] Filed: Sep. 12, 1977

[51] Int. Cl.$^2$ .................. F16D 21/04; F16D 23/12
[52] U.S. Cl. .................. 192/48.91; 192/21; 192/89 QT; 192/93 R; 192/96; 192/109 A; 192/114 R
[58] Field of Search ............ 192/109 A, 21, 51, 93 R, 192/96, 97, 48.91, 53 G, 89 QT, 114 R; 74/370, 371, 372

[56] References Cited

U.S. PATENT DOCUMENTS

| | | | |
|---|---|---|---|
| 1,703,846 | 2/1929 | Jackson | 192/53 G |
| 2,019,073 | 10/1935 | Cooper et al. | 192/48.91 X |
| 2,169,495 | 8/1939 | Jessen | 192/53 G |
| 2,379,901 | 7/1945 | Hare | 192/48.91 |
| 2,544,809 | 3/1951 | Stanley | 192/48.91 X |
| 2,663,277 | 12/1953 | Armstrong et al. | 192/93 R |
| 2,718,792 | 9/1955 | Kiekhaefer | 192/93 R |
| 2,739,560 | 3/1956 | Armstrong et al. | 192/51 |
| 3,386,546 | 6/1968 | Vourich | 192/51 |
| 3,455,420 | 7/1969 | Blanchard, Jr. | 192/51 |
| 3,818,855 | 6/1974 | Schinanckas | 192/51 |

Primary Examiner—Allan D. Herrmann
Attorney, Agent, or Firm—Andrus, Sceales, Starke & Sawall

[57] ABSTRACT

A clutch apparatus for a marine drive lower gear case includes a propeller shaft rotatably mounted in a gear case housing. A drive gear for both forward and reverse is positioned in the housing coaxial with the propeller shaft and a clutch member is rotatably fixed on the propeller shaft and movable axially into drive engagement with the drive gear. Clutch engaging elements are provided on opposed portions of the drive gears and the clutch member. Shift means utilizing a positive acting cam means positively move the clutch member into and out of engagement from the drive gears. The shift means also include a releasable latch means to positively maintain the shift means in the engaged position and a preloading means between the shift means and the clutch member to snap the clutch member into engagement.

16 Claims, 8 Drawing Figures

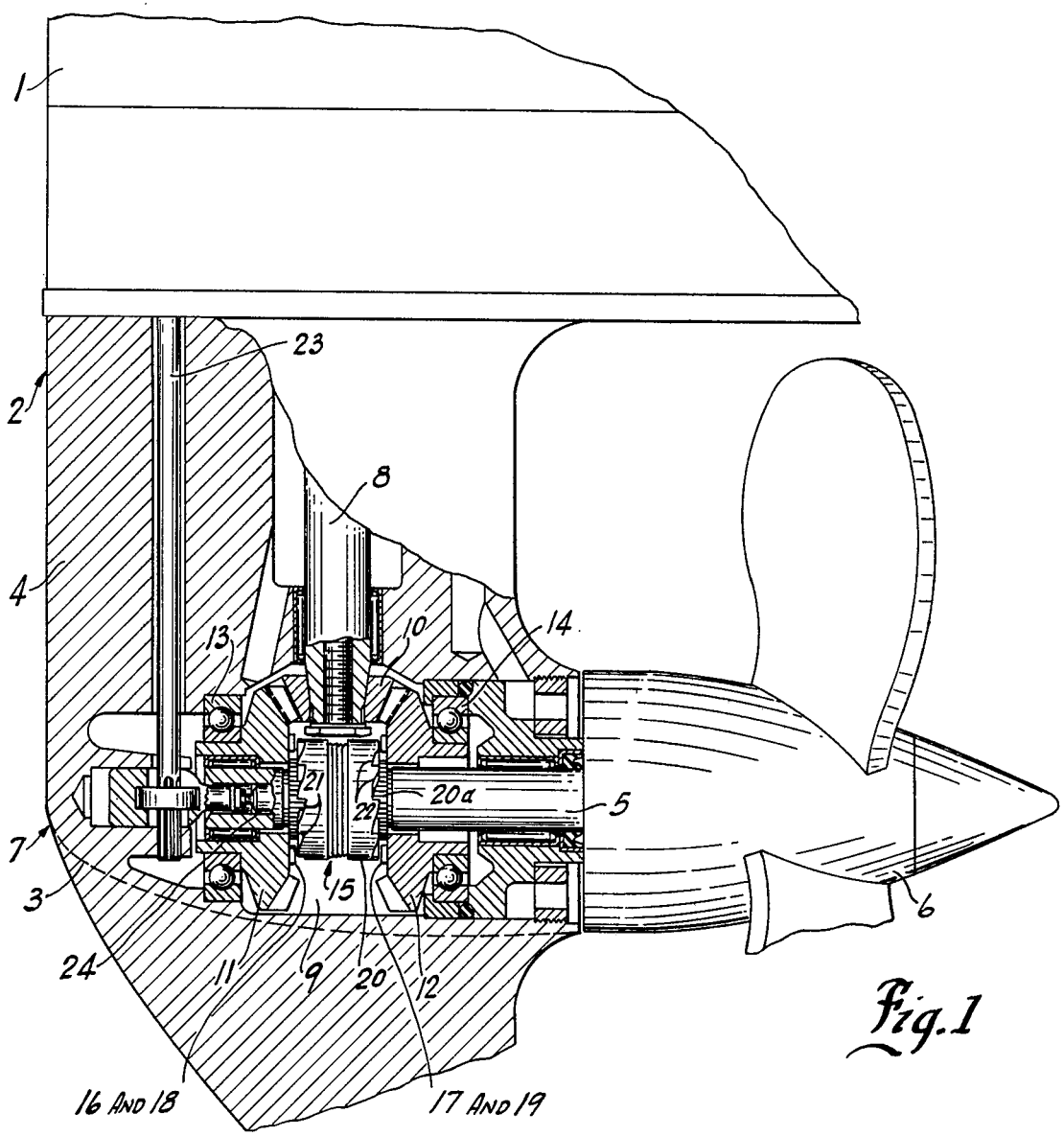
Fig. 1
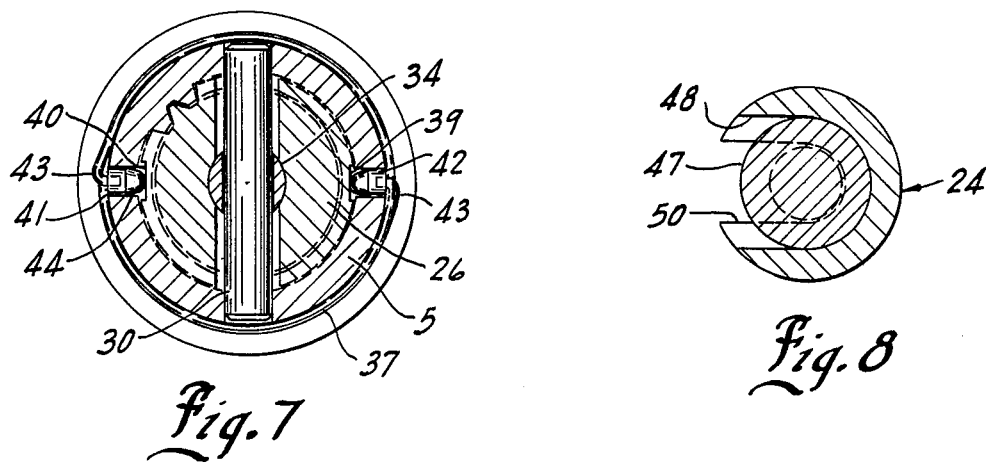
Fig. 7
Fig. 8

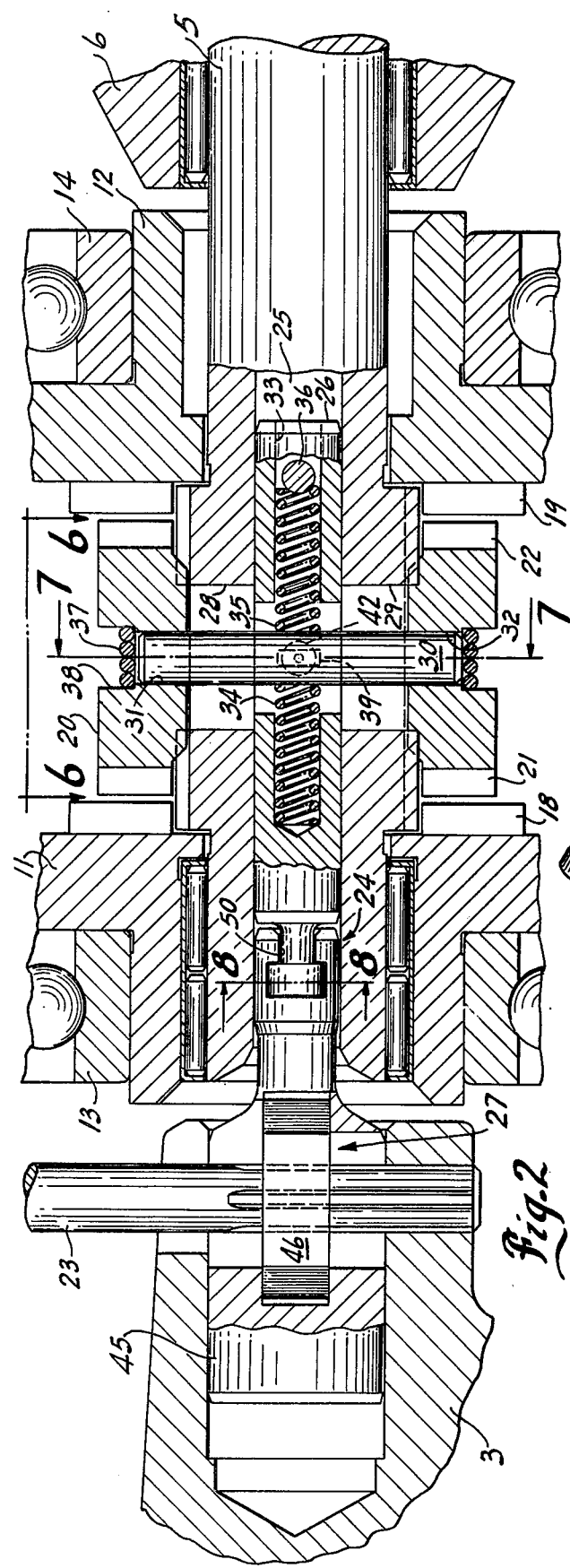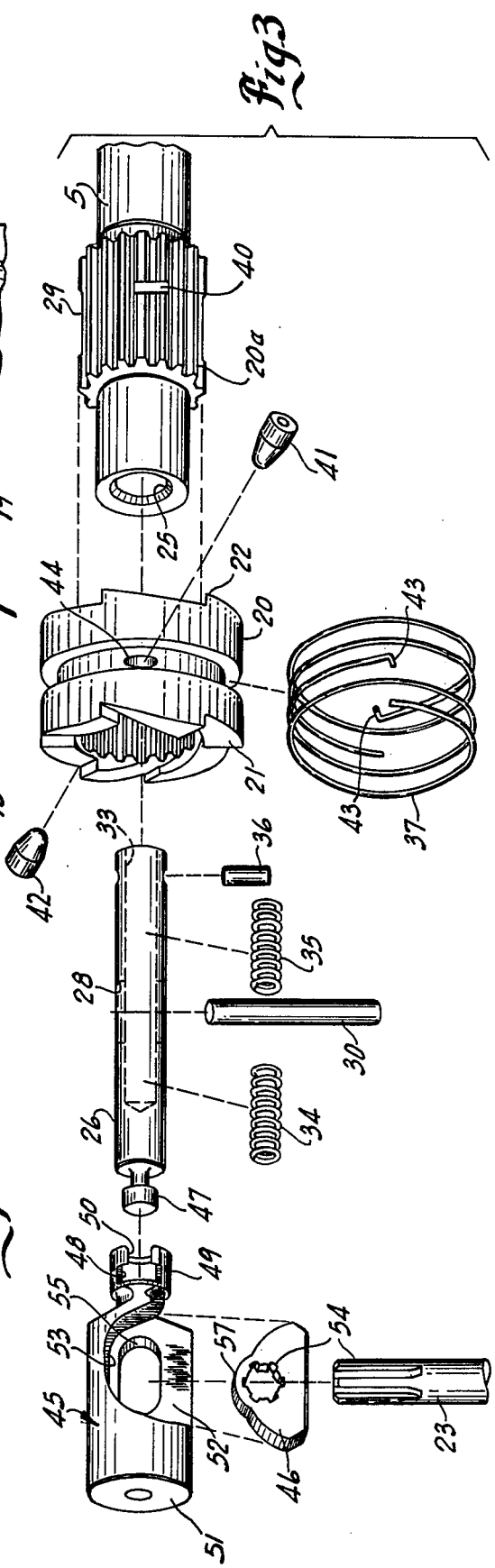

4,223,773

DRIVE ENGAGING APPARATUS

BACKGROUND OF THE INVENTION

This invention relates to a clutch apparatus and particularly concerns a positively shifted clutch apparatus for marine propulsion engines.

Clutch mechanisms have been employed for selectively connecting a drive gear and a driven gear to establish one of two opposite rotating outputs. In marine outboard engines, the lower gear case includes a propeller shaft. A pair of axially spaced driven bevel gears are rotatably mounted on the shaft and coupled to a drive bevel gear connected by a drive shaft to the internal combustion engine. The driven bevel gears are oppositely rotated. A clutch mechanism which includes a movable clutch collar is mounted on and coupled to the shaft by a pin and slot connection between the driven bevel gears. The clutch collar is movable between a neutral position, a forward position and a reverse position. The opposite faces of the clutch collar and the opposed faces of the bevel gears are formed with complementing positive engaging clutch teeth or jaws for positive coupling of the driven gears to the shaft. The clutch collar is generally spring-loaded to the forward drive position. It is connected through a coaxial shift rod to a rotating cam mounted in the forward end of the gear case and actuated by a vertical shift shaft to position the clutch collar against the spring loading of the collar. The spring thus forms the actuating force on the collar when shifting from reverse to neutral to forward shift positions. Generally, the clutch jaws of the clutch collar and reverse driven gear are formed with a positive angle drive face to create a disengaging force component of the driving force transmitted through the clutch jaws. The positive angle construction thus assists the spring in overcoming the friction at the driving jaw faces when shifting from reverse, and thereby permits shifting to neutral. However, the required positive angle structure creates a relatively heavy loading of the cam and cam shift rod with a corresponding wear of the components. The worn components result in mislocation of the clutch collar and prevent proper shifting into reverse. Further, the forward gear and collar jaws are required to have a negative angle driving jaw face which assists the spring in holding the forward jaws engaged. The heavy loading provided by the positive and negative jaw angles also require substantial shift operating forces in shifting.

SUMMARY OF THE INVENTION

The present invention is directed to a clutch apparatus including (a) a housing (b) an output shaft rotatably mounted in the housing, (c) a drive member positioned in the housing coaxial with the output shaft, (d) a clutch member rotatably fixed on the output shaft and movably axially into drive engagement wtih the drive means and, (e) shift means for positively moving the clutch member on the output shaft between a first position with the clutch member disengaged from the drive means and a second position with the clutch member engaged with the drive means, the means for positively moving the clutch member including control means directly connected to the clutch member.

The positive positioning particularly in reverse gear provided by the invention eliminates the high compressive force of the prior spring actuated cam follower. This reduces the shift forces and driving torque requirement as well as eliminating the need for positive (push out) clutch jaws. In addition the snapping into gear permits the operator to shift gears without any gear engagement noise.

BRIEF DESCRIPTION OF THE DRAWINGS

FIG. 1 is a fragmentary side view, partially in section, of a marine propulsion lower unit constructed in accordance with this invention;

FIG. 2 is an enlarged vertical section through the gear case shown in FIG. 1;

FIG. 3 is a pictorial exploded view of the clutch mechanism shown in FIGS. 1-2;

FIG. 7 is a transverse vertical section taken generally on line 7—7 of FIG. 2; and FIG. 8 is a transverse vertical section taken generally on line 8—8 of FIG. 2.

DESCRIPTION OF THE PREFERRED EMBODIMENT

Figure 4:
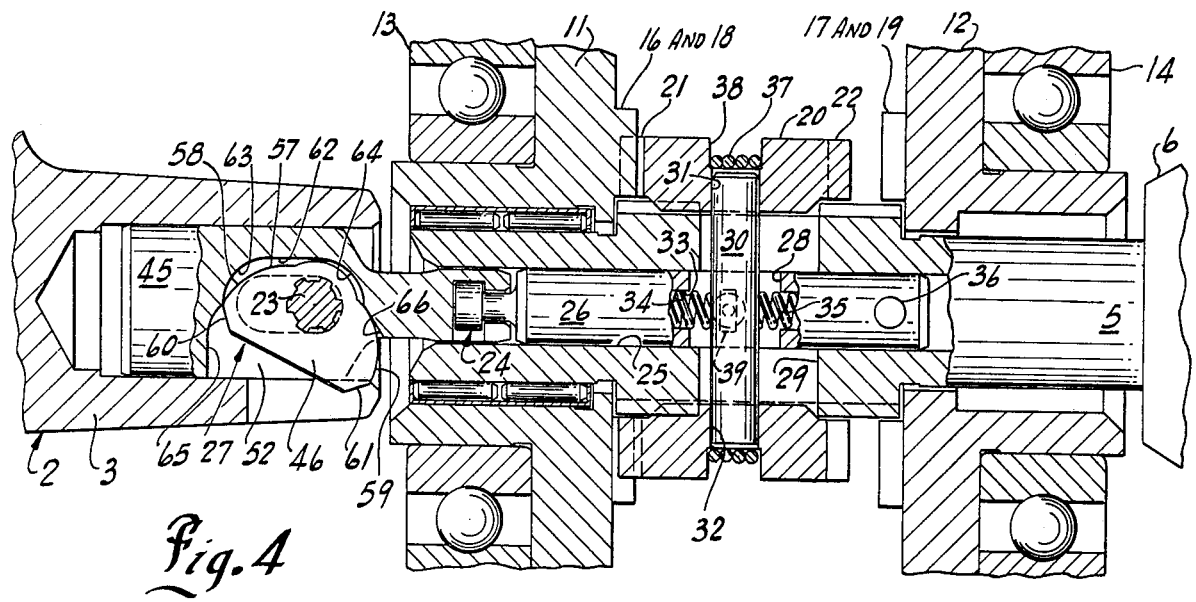
FIG. 4 is a view similar to FIG. 2 taken on a horizontal section and illustrating the forward drive position.

Referring to the drawings and particularly FIG. 1, a fragmentary portion of an outboard motor is shown including a drive shaft housing 1 which supports a drive engine (not shown) at its upper end. A lower unit 2, secured to the lower end of housing 1, includes a gear case 3 integrally formed as a torpedo-shaped section to a narrow strut 4 having a top planar mounting face. A propeller or output shaft 5 is rotatably mounted within the gear case 3 and protrudes from the rear end. A propeller 6 is secured to the output shaft 5. The rear end of case 3 is truncated and propeller 6 includes a hub 7 which extends the configuration of the case 3 to the end of the output shaft 5.

The output shaft 5 and the propeller 6 are driven by a vertical drive shaft 8 connected at the upper end to the engine. The drive shaft 8 is rotatably supported in the strut 4 with the lower end located immediately above the gear chamber 9 formed by gear case 3. A drive bevel gear 10 is secured to the lower splined end of drive shaft 8. Bevel gear 10 meshes with aligned forward and reverse driven bevel gears 11 and 12 which are rotatably mounted coaxially with shaft 5 by suitable ball bearing units 13 and 14 within the gear chamber 9. Driven gear 11 and 12 are drive members to output shaft 5. The bevel gears 11 and 12 are selectively coupled to output shaft 5 by a clutch member 15 which provides for rotation of propeller 6 in a forward reverse direction.

Clutch engaging elements 16 and 17 formed with clutch teeth 18 and 19 are fitted within the driven bevel gears 11 and 12. A clutch member or collar 20 is slidably mounted on output shaft 5 by splined connection 20a. The end face of the clutch collar 20 is also formed with clutch teeth 21 and 22 which mate with the teeth 18 and 19 on the clutch engaging elements 16 and 17 of the bevel gears 11 and 12.

The clutch collar 20 is axially movable to a neutral position midway between elements 16 and 17 which permits operation of the engine without rotating the propeller 6. The collar 20 is movable in opposite directions from the neutral position to selectively engage either the clutch teeth 18 and 21 to establish a forward drive rotation of output shaft 5 with propeller 6 or the clutch teeth 19 and 22 to establish a reverse rotation thereof.

The clutch collar 20 is axially positioned by a rotating shift shaft 23 rotatably mounted within the forward portion of the lower unit 2 and the drive shaft housing 1. The shift shaft 23 is rotated by a suitable lever means (not shown) such as a manually operated lever coupled with a remote cable shift control.

The present invention is particularly directed to shift means for positively moving the clutch collar 20. The shift means includes control means which include a control rod or member 26, engaging cam means to positively move the clutch collar 20 and releasable latch means to positively maintain the shift means engaged.

Referring to FIGS. 2 through 5 the output shaft 5 is formed with an axial bore 25 extending inwardly from the innermost end through the splined connection. The control member 26 is slidably mounted within the bore 25. The shift means also includes preloading means for snapping the clutch collar 20 into engagement with the drive members or level gears 11 and 12. The preloading means include resilient means connecting between the clutch collar 20 and the shift means and releasable connecting means engaging between the clutch collar 20 and the output shaft 5. The resilient means and the releasable connecting means cooperate to provide a snap action engagement of the clutch collar 20 and the drive member or bevel gear 11 or 12 and the resilient means separately provides a slip between the drive member and the clutch member when the output shaft 5 rotates at a speed greater than the speed of the drive member.

The resilient means include a cross pin member 30, a radial slot 28 through the control member and recess means or axial bore 33 extended to the opposite sides of the radial slot 28 and spring means or coil srings 34 and 35 positioned within the recess means to the opposite sides of the cross pin member 30 and resiliently holding the cross pin member 30 substantially centered within said radial slot 28. The output shaft 5 also includes an axial slot 29 and the clutch collar 20 has axial holes 31 and 32 aligned with the slots 28 and 29. The cross pin member 30 extends through the slots 28 and 29 and is secured in the holes 31 and 32 in the clutch collar 20. The outer end of the bore 33 is closed by pin 36 and the coil springs 34 and 35 are stressed to urge and hold the pin 30 centrally of the slot 28, and thereby locate the collar 20 substantially centered in neutral drive position upon the splined connection 20a.

The releasable connecting means include at least one detent notch in the output shaft 5, at least one detent pin in a radial hole in the clutch collar 20 and spring means forcing the detent pin into engagement with the detent notch. In the preferred embodiment there are two detents notches 39 and 40 in the output shaft 5 and two detent pins 41 and 42 each having a ball end positioned in openings 44 in the clutch collar 20. The spring means includes a wrapped coil spring 37 surrounding the clutch collar within a center recess or groove 38 and having at least one end bent in a radial direction with the clutch collar. The bent end engages the detent pin to force the detent pin into the notch. In the preferred embodiment illustrated in FIGS. 2 and 3 the spring means has two bent ends 43 to force each of the two detent pins 41 and 42 into mating notches.

The detent pins 41 and 42 releasably hold the collar 20 in the neutral position until the force on the coil springs 34 and 35 is greater than the holding force of the detent pins 41 and 42 in the detent notches 39 and 40. The initial movement of the control member 26 from the neutral position does not move the cross pin 30 but partially compresses the spring 34 or 35 whichever is opposing such movement. For example, forcing control member 26 to the left in FIG. 2 results in the spring 35 being compressed, until its force is greater than the holding force from the detents. The detents 41 and 42 then release from the detent notches 39 and 40 and the spring 35 rapidly expands snapping the clutch collar 20 from neutral into engagement with the clutch teeth 18 of the forward driven gear 11 as shown in FIG. 4. This avoids the usual raking of the teeth and results in a smooth silent shifting.

The opposite movement of the control member 26 to the right as viewed in FIG. 2, similarly compresses spring 34 to provide a snapping of the clutch collar 20 into engagement with the reverse drive gear 12.

The control member 26 and collar 20 are positively held in the neutral position by the detent notches 39 and 40 and the detent pins 41 and 42 and in the drive position by a releasable latch means. The releasable latch means includes a latching surface on the cam and a mating latching surface on the cam follower.

The shift means also includes engaging cam means to positively move the clutch collar 20. The engaging cam means include a cam 46 positioned in the gear case 3 and a cam follower 45 rotatably connected to the shift means and positioned in the housing to engage the cam 46 to positively position the control member 26 for moving the clutch collar. The rotation of the cam 46 reciprocates the cam follower 45 which in turn reciprocates the control member 26. At the end of its travel in both rotational directions the cam 46 and cam follower 45 provide latching by the releasable latch means as presently described.

The cam engaging means 27 includes the cam follower 45 connected to the control member 26 and a cam 46 coupled to and rotated by shaft 23. The rotation of cam 46 reciprocates the cam follower 45 and control member 26 and at the end of its travel in both directions positively latches the clutch collar 20.

In the illustrated embodiment, the control member 26 is connected by a linkage or rotary coupling 24 to the cam follower 45. The rotary coupling 24 includes a necked and button "T" head 47 on the control member which is rotatably journaled in a stepped cylindrical recess 48 in the end of the cam 45. The recess 48 is provided with an entrance slot 50 permitting assembly of the "T" head to the cam follower 45. This permits a reciprocating movement of the cam follower 45 and a rotational movement of the control member 26.

The cam follower 45 includes a body portion 51 shown as a solid cylindrical member having cam recess 52 formed in the upper surface with a generally U-shaped cam surface or wall 53. Cam 46 is coupled to the shift shaft 23 by a splined connection 54, with the shift shaft 23 extending through a splined hole in the cam 46 and ending in a hole in gear case 3 which forms a bearing support for the end of the shift shaft 23. Cam 46 has a cam surface 57 located in sliding engagement with the cam surface 53 in cam follower 45. The cam 46 and cam follower 45 are formed with bisymmetrical mating cam ramps. Therefore, opposite rotation of the cam 46 directly and positively control the linear movement of the cam follower 45 and control member 26.

Figure 5:
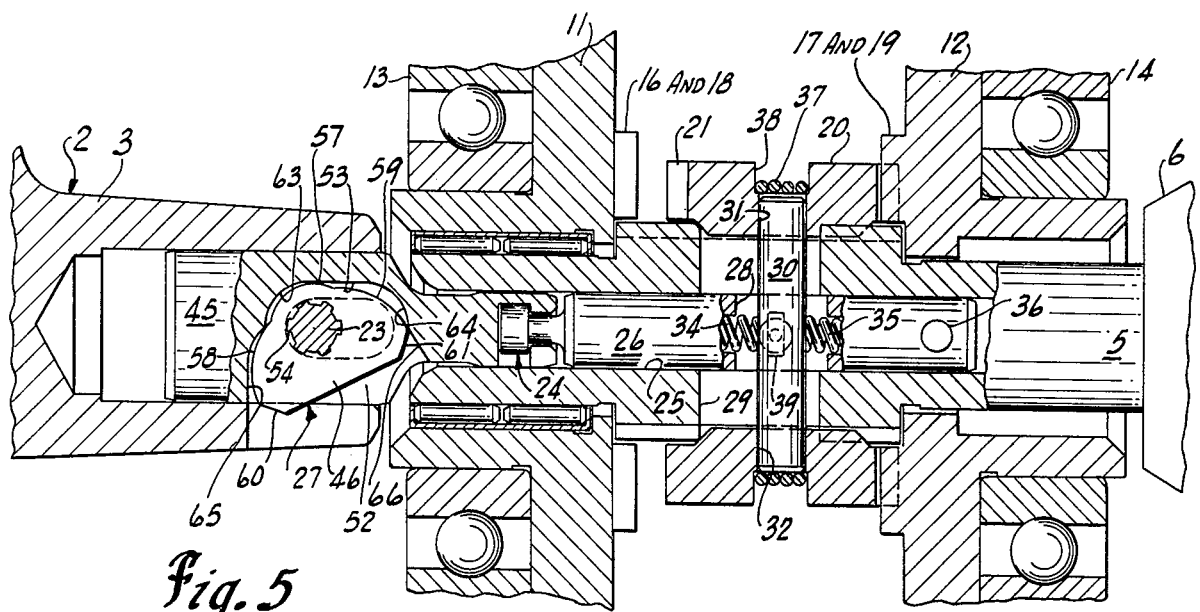
FIG. 5 is a view similar to FIG. 4 illustrating the reverse drive position.
Figure 6:
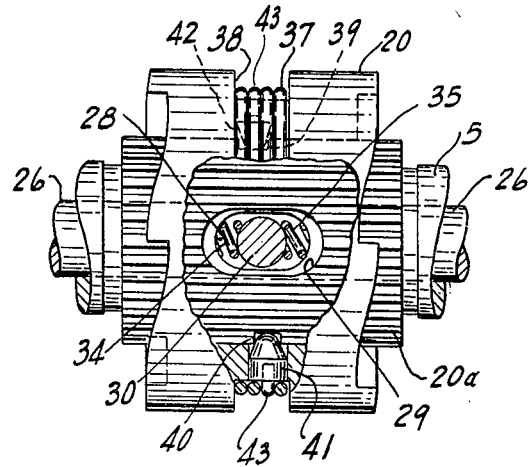
FIG. 6 is a plan view of the shift mechanism taken generally on line 6—6 of FIG. 2.

More particularly as shown in FIGS. 3, 4 and 5 the cam 46 is generally a semi-circular member having the splined connection 54 with the shift shaft 23 adjacent the center of the semi-circular periphery. The cam surface 57 of the cam 46 similarly curves rapidly inwardly in the opposite direction from the center and about the splined connection 54 to similar curved forward and reverse operating cam surfaces 58 and 59. The cam surfaces 58 and 59 merge into latching means or forward and reverse latch cam ramps 60 and 61 at each of the opposite ends of cam 46.

The cam recess 52 in cam follower 45 and particularly U-shaped cam wall 53 is similarly formed with a central, generally flat portion 62 connected to similar curved end cam surfaces 63 and 64 of outwardly diverging wall construction and each including transverse flat walls 65 and 66. In the neutral position the cam 46 is symmetrically located within the cam recess 53 with the opposite ends of the cam ramps 60 and 61 abutting the cam surfaces 63 and 64 at the connection to the latch walls 65 and 66.

Rotation of the cam 46, in the clockwise direction as shown in FIG. 4, causes the shift cam surface 59, to move outwardly of the neutral position into the adjacent offset portion of the cam recess 52. The opposite shift cam surface 58 rotates and moves inwardly of the neutral position of the curved end cam surface 63, exerting a force thereon which forces the cam follower 45 to move to the left as the shift cam surface 59 moves outwardly. The full shift rotation of the shift shaft 23 and the attached cam 46 moves the latch or cam ramp 60 into the curved end cam surface or latch portion 63 of the recess 52. The control member 26 is thereby pulled to the left, loads springs 35 and by the time of latching to the shift position moves the pin 30 to the left in the radial slot 29 in the output shaft 5. The clutch teeth 21 of the clutch collar 20 snap into engagement with the clutch teeth 18 of the forward rotating bevel gear 11 because the coil spring 35 is compressed and as the detent force is overcome the clutch collar 20 is released from the neutral position as previously described.

The reverse rotation of the cam 46 causes the latch cam ramp 60 to move out of engagement with cam follower surface 63 while the opposite shift cam surface 59 engages the curved end cam surface of cam follower 45 to positively unlatch the latched cam follower 45. The counter-clockwise rotation of the cam 46 causes the opposite shift cam surface 59 to engage the curved end cam surface 64 and outer cam ramp surface of recess 52 to positively reposition the cam follower 45 at the neutral position. Referring to FIG. 5, if the counter-clockwise rotation is continued to a complete reverse position, the opposite shift cam surface 59 engages the opposite curved end cam surface 64 and similarly reversely positions the cam follower 45 and control member 26 to engage the opposite drive teeth 22 of the collar 20 with the reverse drive gear 12 and correspondingly rotate the propeller 6 for reverse propulsion. The latch cam ramp 61 moves against the curved end cam surface 64 and again positively latches the cam follower 45 and control member 26 in the shifted position.

We claim:
1. A clutch apparatus comprising
 (a) a housing
 (b) an output shaft rotatably mounted in said housing,
 (c) a drive member positioned in said housing coaxial with said output shaft,
 (d) a clutch member rotatably fixed on said output shaft and moveable axially into drive engagement with said drive member and,
 (e) shift means for positively moving the clutch member on said output shaft between a first position with said clutch member disengaged from said drive member and a second position with said clutch member engaged with said drive member, said shift means for positively moving the clutch member including control means directly connected to said clutch member and including:
  (A) a rotatable control member movable axially of the output shaft and coupled to the clutch member to rotate with the clutch member;
  (B) an engaging two-piece cam means having a first non-rotatable cam follower member movable between first and second control positions, means rotatably connecting said control member to said cam follower member and axially moving said control member in one direction to establish said first position and axially moving said control member in the opposite direction to establish said second position in response to the corresponding movement of the cam follower member, and a second cam member coupled to said first cam follower member for positioning said first cam follower member between said first and second control positions.

2. The clutch apparatus defined in claim 1 wherein said control means includes
 (a) a releasable latch means to positively maintain the shift means in the engaged position.

3. The clutch apparatus defined in claim 2 additionally including a linkage means connecting said control member and said releasable latch means.

4. The clutch apparatus defined in claim 1 additionally including clutch engaging elements operable in the drive direction provided on the opposed portion of said clutch member and said drive member wherein said shaft means additionally includes resilient means connected between said clutch means and said shift means whereby said resilient means provides a slip of said drive means and said clutch means when said drive member exceeds the speed of said clutch member.

5. The clutch apparatus defined in claim 1 wherein said shift means additionally includes preloading means for snapping said clutch member into engagement with said drive member.

6. The clutch apparatus defined in claim 5 wherein said preloading means comprises
 (a) resilient means connecting between said clutch member and said shift means, and
 (b) releasable connecting means engaging between said clutch member and said output shaft whereby said resilient means is stressed before movement of the clutch member to overcome said releasable connecting means and thereby cooperate to provide a snapping engagement of said clutch member and said drive means and said resilient means provides a slip between said drive means and said clutch member when said output shaft rotates at a speed greater than the speed of said drive means.

7. The clutch apparatus defined in claim 6 wherein said clutch member includes at least one radial hole and said releasable connecting means comprising
 (a) at least one detent notch in said output shaft, (b) at least one detent pin located in said radial hole in said clutch member, said detent pin having one ball end, and (c) spring means forcing said detent pin into engagement with said detent notch.

8. The clutch apparatus defined in claim 7 wherein said spring means comprise a coil spring surrounding said clutch member and having at least one end bent in a radial direction with said clutch member, said end engaging said detent pin to force said detent pin into said notch.

9. A clutch apparatus comprising
(a) a housing
(b) an output shaft rotatably mounted in said housing,
(c) a drive member positioned in said housing coaxial with said output shaft,
(d) a clutch member rotatably fixed on said output shaft and moveably axially into drive engagement with said drive member and,
(e) shift means for positively moving the clutch member on said output shaft between a first position with said clutch member disengaged from said drive member and a second position with said clutch member engaged with said drive member, said shift means for positively moving the clutch member including control means directly connected to said clutch member and including:
(A) a rotatable control member movable axially of the output shaft and coupled to the clutch member;
(B) an engaging cam means having a first non-rotatable cam follower member rotatably coupled to said control member for axially moving of said control member and a second cam member mounted for positioning said first cam member, wherein said drive member includes a pair of oppositely driven and spaced drive members, said clutch member being oppositely movable from a selected neutral position into engagement with either one of said drive members, and wherein one of said cam members is formed with a recess having a cam surface including similar ramps spaced axially of the shaft movement, the other of said cam members being mounted within said recess for relative rotation within the recess and including opposite end cam follower surfaces aligned with said cam ramps in a neutral cam position, said cam members being oppositely rotated to oppositely position said first cam member and move the control member to a clutch member engaging position in response to a fully rotated position.

10. The clutch apparatus defined in claim 9 having a releasable latch means including a latching surface on said cam surface and a mating latching surface on said cam follower surfaces to positively maintain the shift means in the engaged position.

11. A clutch apparatus comprising
(a) a housing
(b) an output shaft rotatably mounted in said housing,
(c) a drive member positioned in said housing coaxial with said output shaft,
(d) a clutch member rotatably fixed on said output shaft and moveably axially into drive engagement with said drive member and,
(e) a releasable connecting means positioned between said clutch member and said output shaft to hold said clutch member disengaged from said drive member (f) said output shaft formed with an axial opening, a control member slidably mounted in said axial opening, (g) said output shaft and said control member formed with aligned axial slots and said clutch member formed with axial holes aligned with said slots, a cross pin member extending through said slots in said output shaft and said control member and secured in said holes in said clutch member (h) said control member having internal recesses to the opposite sides of said slot, resilient means located in said recesses to the opposite sides of said cross pin member and resiliently holding said cross pin member within a central portion of said slot, and (i) shift means coupled to said control member for preloading and moving said control member in either of opposite axial directions to stress one of said resilient means against said cross pin until said releasable connecting means is released and said clutch member is snapped into operative engagement with said drive member.

12. A clutch apparatus comprising
(a) a housing
(b) an output shaft rotatably mounted in said housing,
(c) a drive member positioned in said housing coaxial with said output shaft,
(d) a clutch member rotatably fixed on said output shaft and moveable axially into drive engagement with said drive member and,
(e) clutch engaging elements provided on opposed portions of said drive member and said clutch member,
(f) a control member mounted for reciprocal movement relative to said clutch member,
(g) a coupling member axially moveable on said control member,
(h) resilient means positioned between said control member and said coupling member to
   (A) permit initial preloading of said coupling member in the direction of movement and
   (B) permit said clutch engaging elements to slip in a rotational direction opposite to the drive direction, and
(i) releasable means between said clutch member and said output shaft to
   (A) hold said clutch member to said output shaft and permit initial preloading of said coupling member in response to movement of said control member, and
(j) shift means attached to said control member to positively move said control member to preload said coupling member to overcome said releasable means.

13. A clutch apparatus comprising
(a) a housing
(b) an output shaft rotatably mounted in said housing,
(c) a drive member positioned in said housing coaxial with said output shaft,
(d) a clutch member rotatably fixed on said output shaft and moveably axially into drive engagement with said drive member,
(e) clutch engaging elements provided on opposed portions of said drive member and said clutch member, (f) a control member mounted for reciprocal movement relative to said clutch member, (g) a coupling member axially moveable on said control member, (h) resilient means positioned between said control member and said coupling member to
  (A) permit initial preloading of said coupling member in the direction of movement and
  (B) permit said clutch engaging elements to slip in a rotational direction opposite to the drive direction, and (i) releasable means between said clutch member and said output shaft to
  (A) hold said clutch member to said output shaft and permit initial preloading of said coupling member in response to movement of said control member, and (j) shift means attached to said control member to positively move said control member to preload said coupling member to overcome said releasable means; and wherein said clutch member has two radial holes therethrough, said output shaft has two radial slots therethrough corresponding in axial alignment with said holes in said clutch member and an axial opening therethrough, and said control member having an axial opening therethrough in axial alignment with said holes and said slots, said coupling member comprises a cross pin member, said resilient means comprises two compression springs, said control member positioned in said axial opening in said shaft, said two springs positioned in said axial opening in said control member and said cross pin member extending through the slot in said control member between said two springs and through the slot in said output shaft and secured in said holes in said clutch member.

14. A pendant marine propulsion apparatus comprising
(a) a lower gear unit,
(b) a propeller shaft rotatably mounted in said gear unit,
(c) oppositively rotatable driven means,
(d) a clutch member rotatably fixed to said shaft and moveable axially into engagement with said driven means to effect the rotation of said shaft,
(e) releasable means between said propellor shaft and said clutch member and holding said clutch member disengaged from said driven means,
(f) control means positioned in said gear unit coaxial with said propellor shaft for moving said clutch means,
(g) resilient means between said clutch means and said control means and
(h) shift means connecting to said control means to stress said resilient means and overcome the force of said releasable means and to move said clutch member into engaged position with one of said driven means.

15. A marine propulsion apparatus including
(a) lower reversing gear case,
(b) a propeller shaft rotatably supported in the gear case
(c) a pair of oppositely rotatable driven gears mounted in said gear case substantially concentric with said propeller shaft
(d) a clutch member rotatably fixed to said shaft and moveable axially on said shaft into engagement with said gears to rotate said shaft wherein the improvement comprises (A) a releasable connecting means positioned between said clutch member and said propeller shaft, and holding said clutch member disengaged from said pair of oppositely rotatable driven gears, (B) said propeller shaft formed with an axial opening, a control member slidably mounted in said axial opening, (C) said propeller shaft and said control member formed with aligned axial slots and said clutch member formed with axial holes aligned with said slots, a cross pin member extended through said slots in said propeller shaft and said control member and secured in said holes in said clutch member (d) said control member having internal recesses to the opposite sides of said slot, resilient means located in said recess to the opposite sides of said cross pin member and resiliently holding the pin within a central portion of said slot.

16. A clutch apparatus comprising
(a) a housing
(b) an output shaft rotatably mounted in said housing,
(c) a drive member positioned in said housing coaxial with said output shaft,
(d) a clutch member rotatably fixed on said output shaft and moveable axially into drive engagement with said drive means and,
(e) shift means for positively moving the clutch member on said output shaft between a first position with said clutch member disengaged from said drive member and a second position with said clutch member engaged with said drive member, said shaft means for positively moving the clutch member including control means directly connected to said clutch member and including:
  (A) a rotatable control member movable axially of the output shaft and coupled to the clutch member;
  (B) an engaging cam means having a first non-rotatable cam follower member rotatably coupled to said control member for axially moving of said control member and a second cam member mounted for positioning said first cam member,
(f) said shift means additionally includes preloading means for snapping said clutch member into engagement with said drive member, said preloading means including:
  (A) a control rod having a radial slot therethrough and recess means to the opposite sides of said slot,
  (B) a cross pin member passing through said radial slot,
  (C) spring means positioned within said recess means to the opposite sides of said cross pin member and resiliently holding the cross pin member substantially centered within said slot, and
  (D) releasable connecting means engaging between said clutch member and said output shaft whereby said spring means is stressed before movement of the clutch member to overcome said releasable connecting means and thereby cooperate to provide a snapping engagement of said clutch member and said drive member and said resilient means provides a slip between said drive member and said clutch member when said output shaft rotates at a speed greater than the speed of said drive means.

* * * * *